June 16, 1964   G. R. MULCAHY, JR   3,137,465
LOAD RECOVERY PARACHUTE SYSTEM
Filed April 23, 1963   4 Sheets-Sheet 2
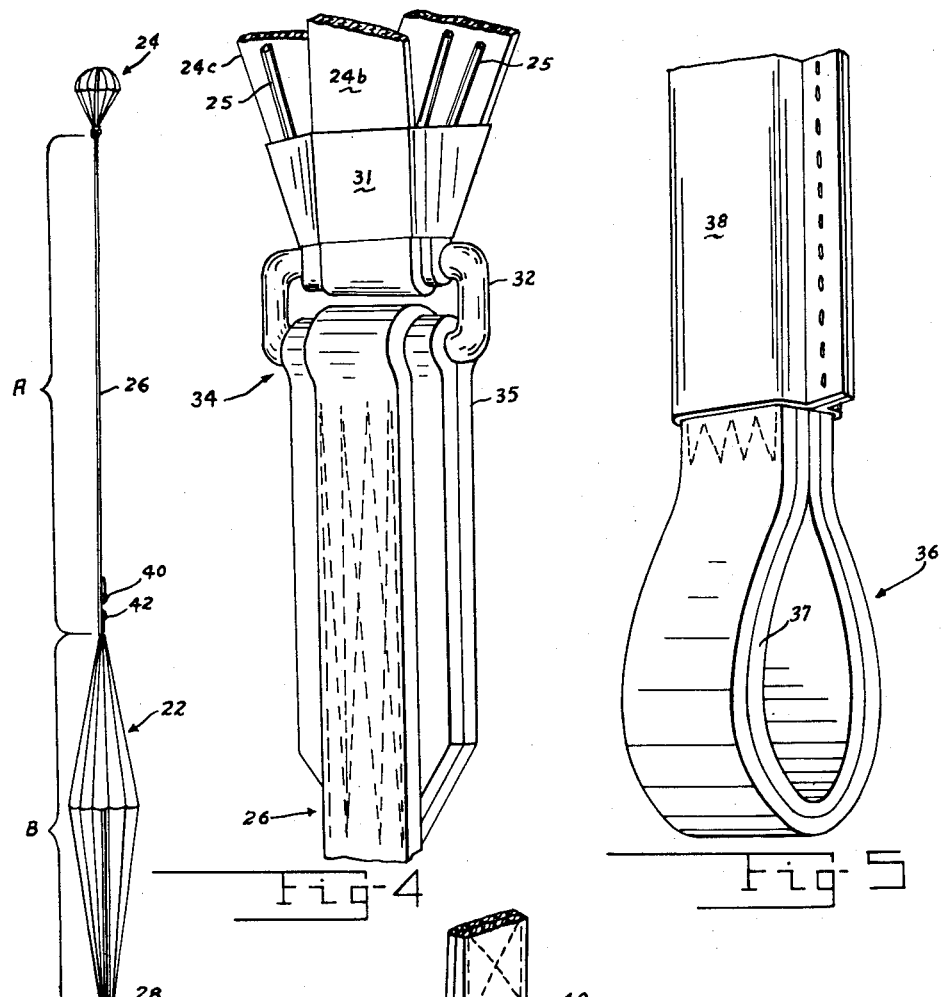
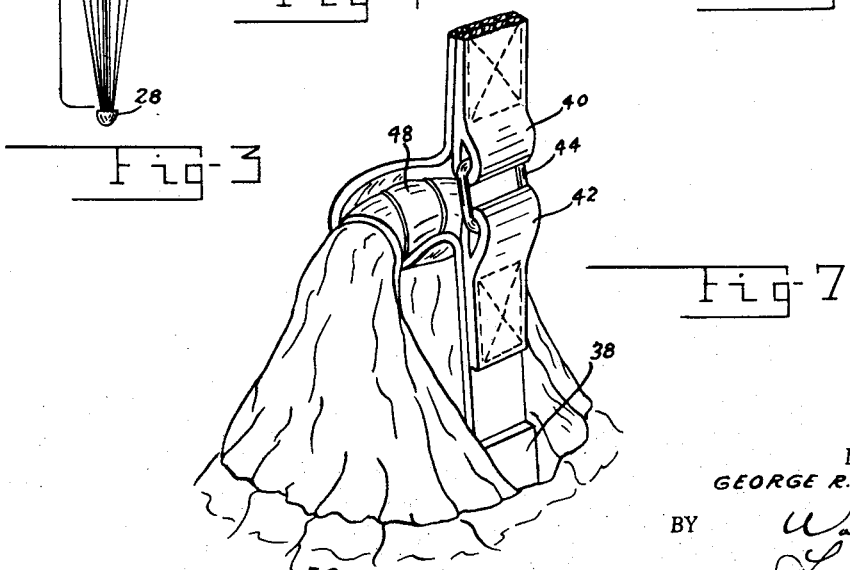
INVENTOR.
GEORGE R. MULCAHY, JR.
BY
ATTORNEYS

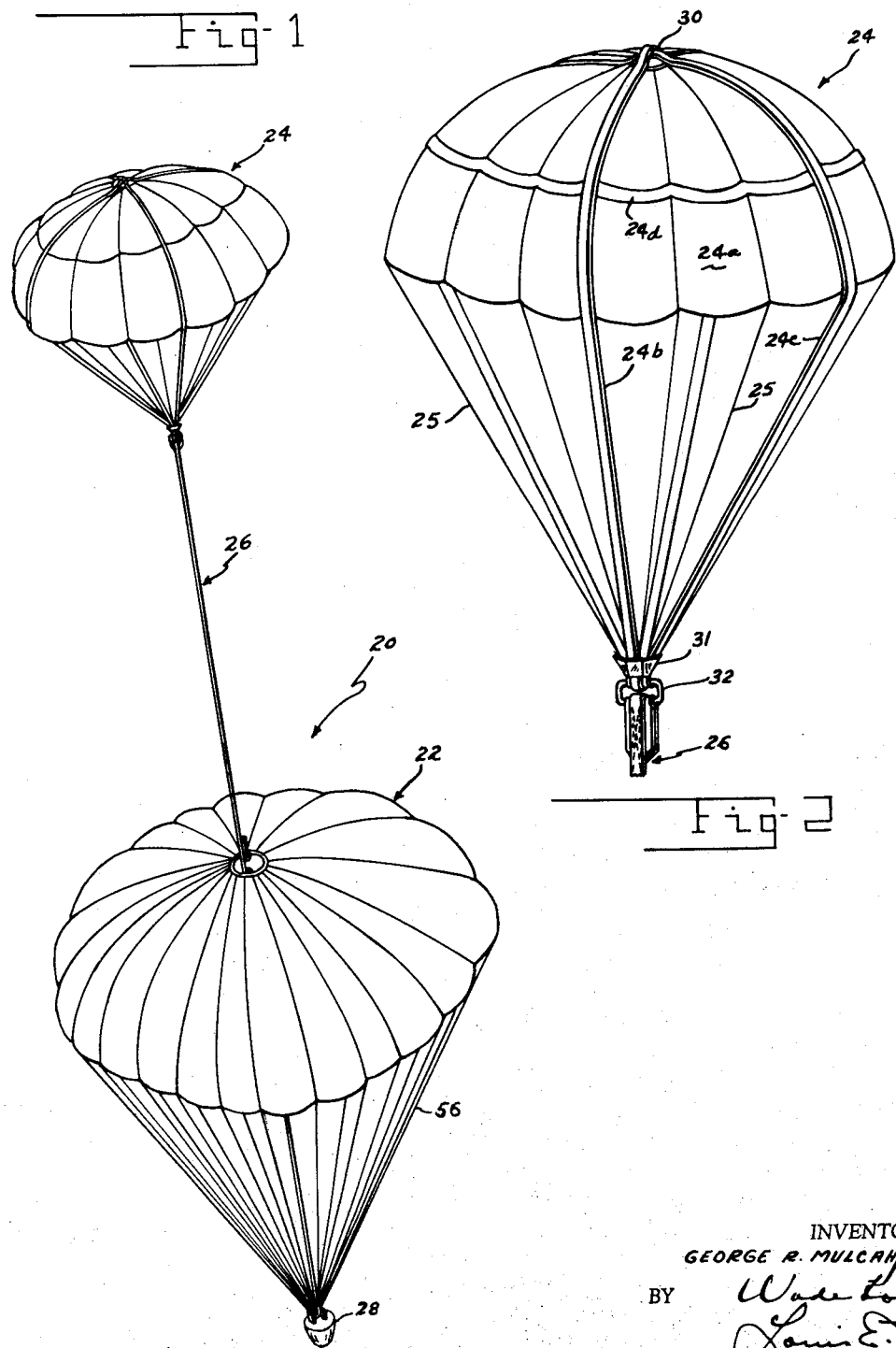

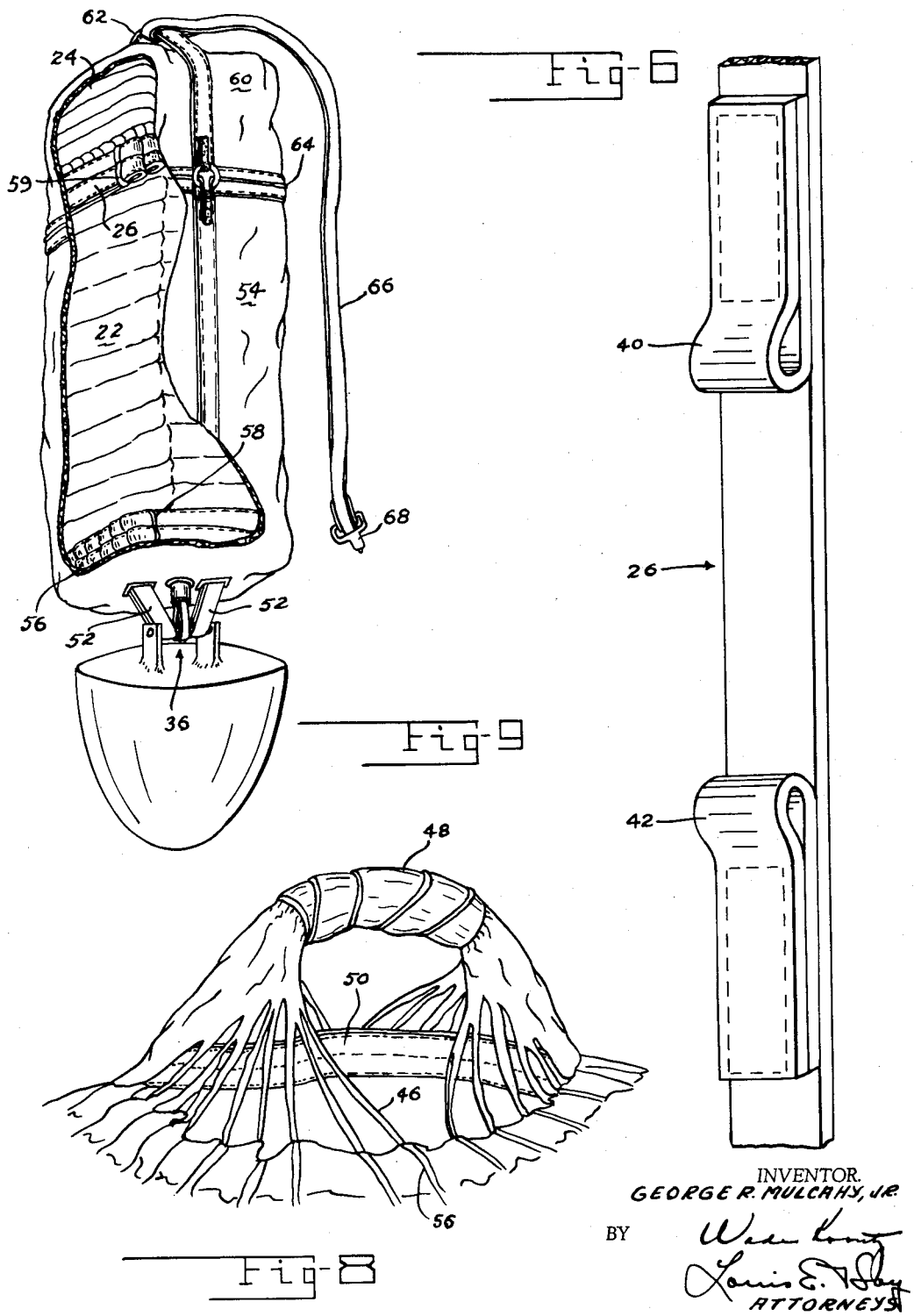

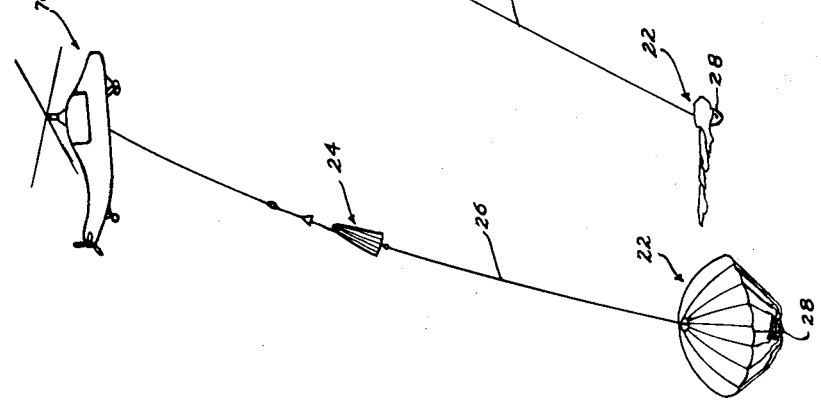
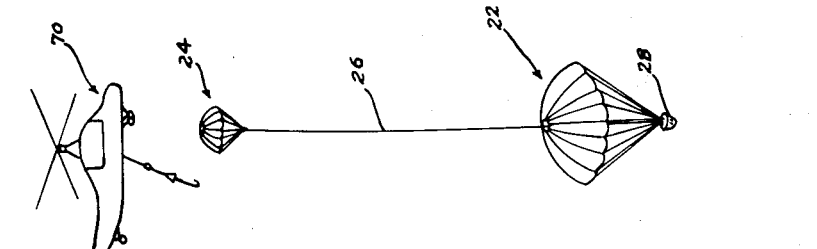

United States Patent Office 3,137,465
Patented June 16, 1964

3,137,465
LOAD RECOVERY PARACHUTE SYSTEM
George R. Mulcahy, Jr., Box 150, La Luz, N. Mex.
Filed Apr. 23, 1963, Ser. No. 275,173
6 Claims. (Cl. 244—142)
(Granted under Title 35, U.S. Code (1952), sec. 266)

The invention described herein may be manufactured and used by or for the Government without the payment to me of any royalty thereon.

This invention relates to parachutes and, more particularly, to parachute systems carrying payloads, which are to be recovered in mid-air by a recovery craft, such as a helicopter; the parachute system with attached payload having been ejected from a high altitude airplane or other space vehicle.

The payloads contemplated are not of the ordinary drop cargo character, such as food and routine packaged supplies, which are able to sustain ground impact. The payloads handled by the present parachute system are usually of a delicate and destructible nature, which would be either seriously damaged or destroyed on ground impact. Such payloads may consist, for example, of scientific apparatus and instrumentation used in connection with high altitude research or observations.

Such apparatus may often be sent aloft in unmanned craft from which it may be ejected on command from a ground installation or from a manned control aircraft. When the apparatus constituting the payload is carried aboard high altitude manned aircraft, the situation often arises where the payload is to be delivered to a ground installation having inadequate or no landing facilities for the particular aircraft in flight. Other situations arise where it is desired to deliver part of the apparatus, such as recorders, to the ground, while further research is conducted; or, to deliver the payload to one ground facility while the aircraft continues on its high altitude flight to another facility hundreds of miles from the drop point. In any of the stated situations, it is obvious that a recovery craft must be used to make a mid-air snatch of the payload and carry it safely to ground.

A parachute system in accordance with this invention, among other things, should have a slow rate of descent. This is extremely desirable in order that the most practical recovery craft, namely a helicopter, may make the contact. The snatch is made by playing out a line from a winch in the helicopter and making the actual catch with the grab hook on the free end of the line. After the catch is made, the parachute system and payload go through a transition from a free falling body to a captive body being towed. The combination of a slowly descending body and a helicopter recovery craft is of particular advantage since it minimizes the danger of mid-air collision and reduces the snatch impact shock on the payload and the recovery craft. After the snatch is made, the parachute system and payload may be towed, or, they may be reeled into the recovery craft.

One object of the present invention is to provide a payload carrying parachute system having a slow rate of descent and which may be easily snatched in mid-air.

Another object of the present invention is to provide a parachute system which upon catch in mid-air produces the minimum snatch impact shock upon the recovery craft and the payload supported by the parachute system.

A further object of this invention is to provide a parachute system in which the payload is supported, during recovery, by a drogue line passing through the main parachute, rather than by shroud lines.

A still further object of the present invention is to provide a parachute system in which, after a mid-air snatch, the payload is drawn into the main parachute, causing it to collapse and thereby reduce the drag on the recovery craft.

Yet another object of the present invention is to provide a parachute system minimizing the danger and damage of mid-air collision.

An additional object of the present invention is to provide a parachute system, the components of which may readily be altered to meet changing operational conditions and environments.

Additional objects, advantages and features of the invention reside in the construction, arrangement and combination of parts involved in the embodiment of the invention as will appear from the following description and accompanying drawings, wherein:

FIG. 1 is a perspective of the parachute system in free descent prior to catch by the recovery craft.

FIG. 2 is a perspective elevation showing construction details of the drogue parachute.

FIG. 3 is a sketch showing the arrangement of the main components and the method of calculating the drogue line length.

FIG. 4 is a sketch showing the details of attaching the drogue line to the drogue parachute.

FIG. 5 is a sketch showing the details of the payload attachment loop on the drogue line.

FIG. 6 is a sketch showing details of the main parachute breakcord attachment loops on the drogue line.

FIG. 7 is a fragmentary sketch showing the method of attaching the apex lines of the main parachute to the drogue line by means of a breakcord.

FIG. 8 is a fragmentary sketch showing the method of bunching the apex lines; and also showing the lining means for reducing friction and reinforcing the vent at the apex of the main parachute.

FIG. 9 is a cutaway sketch showing stowage of an entire recovery parachute system into its deployment bag.

FIG. 10 is a sketch showing the relationship between the parachute system and recovery craft prior to mid-air catch.

FIG. 11 is a sketch showing the recovery craft having made the catch, and the payload being drawn into the main parachute, and FIG. 12 is a sketch showing the entire parachute system in a collapsed condition and being towed or reeled into the recovery craft.

Referring to FIG. 1, the parachute system 20, has for its principal component, a main parachute 22, a drogue parachute 24, and a drogue line 26. As illustrated, the drogue line is joined to the drogue parachute, passes through the vented apex of the main parachute and supports payload 28. The drogue parachute canopy must be of adequate size and must be constructed to produce sufficient lift to support the drogue line under extremely slow rates of descent. The drogue canopy must also be sufficiently strong to support the entire weight of the main parachute, the drogue line and the payload during deployment and pickup shocks, and during opening shock.

The construction details of the drogue parachute 24 are as shown on FIG. 2. The drogue parachute canopy may be constructed of, say fourteen (14) panels 24a made of a strong, low porosity material and formed to provide a chute having a rather flat circular configuration of about fourteen foot diameter. To insure adequate strength, three interlocking bands of high strength nylon material are incorporated into the canopy construction. Two linear bands, band 24b and band 24c, run parallel with the shroud lines on the canopy and are draped over the canopy at substantially right angles to each other. The third band, circular band 24d, is attached substantially parallel to the periphery of the canopy as shown. Slack is left in the linear bands 24b and 24c where they cross the apex of the drogue canopy to form catch loop 30. The drogue canopy suspension or shroud lines 25 may be made of high tensile strength nylon.

In order that the drogue canopy 24 remains inflated at all times after deployment, it must carry its own weight source to produce the minimum amount of drag on the shroud lines 25 to keep the canopy upright and functioning. This is accomplished by means of weight 31 permanently attached to the suspension or shroud lines near their vertex. The suspension lines 25 and the linear reinforcement bands 24b and 24c are formed into a loop at their vertex to facilitate attachment of the drogue parachute canopy to the drogue line 26. A metal connector link 32 attaches the drogue parachute 24 to the upper end of the drogue line 26.

FIG. 3 depicts the manner of determining the overall length of drogue line 26. The drogue line is preferably made from a length of nylon webbing having sufficient strength to sustain the snatch and opening shock forces and to carry the weight of the load after catch. The length of the drogue line may be determined as shown. The total length comprises length "A" representing the distance that drogue parachute 24 is to fly above main parachute 22, plus length "B" representing the length of the outstretched main parachute. To this length is added the length of the material required to form the attaching loops at both ends of the drogue line. It is important that the drogue line be formed of webbing which is elastic, in order to reduce catch forces and thereby prevent damage to the payload or the aircraft machinery, and to minimize aircraft control problems at the moment of engagement.

FIG. 4 shows the detailed formation of the attachment loop 34 at the upper end of the drogue line 26, to which the drogue parachute 24 is joined. The end of the webbing forming the attachment loop 34 is suitably reinforced with a flexible reinforcing member 35 which engages connector link 32 as shown.

FIG. 5 shows the detailed construction for forming attachment loop 36 at the lower end of the drogue line. The loop may be reinforced with a reinforcing strip 37 made of the same material as the drogue line. The attachment loop may be stitched as shown. That portion of the drogue line extending upward from loop 36 to the apex of the main parachute 22 should be covered with a leather sleeve 38 to reduce the possibility of friction burns against the canopy material. The lower attachment loop 36 of the drogue line may be joined to the payload 28 by any convenient means as shown, for example, on FIG. 9.

Referring to FIG. 3, FIG. 6 and FIG. 7, an upper breakcord loop 40 and a lower breakcord loop 42, which may be made of the same webbing as the drogue line 26, are joined to the drogue line as shown. The purpose of the breakcord loops is to attach the drogue line 26 to the apex of the main parachute by use of a breakcord 44 as best shown on FIG. 7. The apex lines 46 of the main parachute 22 may be the central portion of the shroud lines 56. The shroud lines may be draped over and joined to the canopy in much the same manner that linear bands 24b and 24c are draped over and joined to the drogue parachute as shown on FIG. 2. Sufficient slack is left in the apex lines 46 that they may be brought together and bunched into a roll, which is preferably taped with paper tape 48, as best shown on FIG. 7 and FIG. 8. In addition to holding the bunched apex lines in an intergral roll, the tape prevents friction and damage between the drogue line 26 and the apex lines.

The purpose for the attachment of the main parachute to the drogue line is to allow the inflated drogue canopy to extract the main parachute from the deployment bag during deployment. Once the main parachute is fully extracted, weight of the payload on the drogue line forces the breakcord loops 40 and 42 apart, thus severing the breakcord 44 and freeing the drogue line of any attachment to the main parachute. FIG. 8 shows a circular band lining 50 made of cotton webbing and lining the opening at the apex of the main parachute to reinforce the opening and reduce friction burns between the parachute material and the drogue line.

The drogue line and components may be adapted to any particular type of packing and deployment procedure. A simple form of packing is shown in the cutaway drawing of FIG. 9. To prepare the parachute system for packing, the drogue parachute 24 is attached to the upper end of drogue line 26. The lower end of drogue line 26 is then threaded through the apex of the main parachute 22 and between the two main parachute risers 52 as shown on FIG. 9. The breakcord 44 shown on FIG. 7 is then attached, joining the main parachute to the drogue line. The body 54 of the deployment bag is then placed on the risers and attachment loop 36. The risers and the attachment loop are then joined to the payload. A strap (not shown) between the risers may be used to prevent the deployment bag from sliding up the suspension lines of the main parachute during deployment. The main parachute canopy is then placed under tension and the panels folded to the width of body 54. The main parachute suspension or shroud lines 56 are stowed with rubber bands 58 and placed into body 54 followed by the main parachute. The portion of the drogue line 26 extending from the apex of the main parachute to the drogue parachute is then folded and stowed with rubber bands 59; and then placed atop the stowed main parachute. The drogue parachute bands 24b and 24c, and the suspension or shroud lines 25, as well as the drogue canopy are folded and placed into body 54. Cap 60 is then tied to the apex of the drogue parachute by means of breakcord 62 engaging catch loop 30, and then laced to body 54 by means of breakcord 64.

The parachute system is deployed by means of a static line 66 which is affixed to cap 60 and attached to the aircraft or missile by means of a line snap 68. As the payload and parachute system fall away from the carrier, the static line plays out and then tugs on the cap, breaking breakcord 64. The cap then separates from body 54 and extracts the drogue parachute by means of the breakcord 62. Once the drogue parachute is extracted, the breakcord 62 severs and frees the entire system from attachment to the carrier. As the drogue parachute deploys the stowed drogue line, the main parachute is pulled from body 54 by breakcord 44. Upon line strength of the main parachute 22, the breakcord 44 breaks and frees the drogue line from attachment to the main parachute. The main parachute then inflates and the system is ready for catch.

The recovery craft 70 approaches the inflated drogue parachute as shown on FIG. 10 and hooks the catch loop 30 shown on FIG. 2. An automatic winch in the recovery craft allows the tow line and caught system to pay out, dissipating catch forces. As the winch begins to brake the payload is drawn up into the main parachute canopy as shown on FIG. 11. During this period the elasticity of the drogue line equalizes shock between payload and aircraft machinery. As soon as the winch line is completely braked as in FIG. 12, the payload is pulled up into the canopy, the canopy is collapsed and the payload may be winched into the recovery craft or towed to a ground crew.

It is to be understood that the embodiment of the present invention as shown and described is to be regarded as illustrative only and that the invention is susceptible to variations, modifications and changes within the scope of the appended claims.

I claim:

1. A parachute system for carrying a suspended payload and adapted to be caught and collapsed in mid-air from a recovery craft and comprising: a main parachute having a canopy with a vented apex, and a plurality of shroud lines joined to the canopy and having ends terminating in risers adapted for attaching to said payload; a drogue parachute for flying above said main parachute and comprising a canopy, a plurality of shroud lines joined to said canopy and having ends terminating in a vertex, a connector link joined to the vertex of the shroud lines, and at least one reinforcing band joined to the canopy with slack at the apex of the canopy to provide a catch loop and having the free ends joined with the ends of the shroud lines forming the vertex joined to the connector link; and a drogue line passing through the vented apex on the canopy of said main parachute and having the upper end joined to the connector link on said drogue parachute and the lower end joined to said payload.

2. A parachute system for carrying a suspended payload and adapted to be caught and collapsed in mid-air from a recovery craft and comprising: a main parachute having a canopy with a vented apex, and a plurality of shroud lines joined to the canopy and having ends terminating in risers adapted for attaching to said payload; a drogue parachute for flying above said main parachute and comprising a canopy, a plurality of shroud lines joined to said canopy and having ends terminating in a vertex, a connector link joined to the vertex of the shroud lines, two linear reinforcing bands draped over and joined to the canopy at substantially right angle to each other with slack at the apex of the canopy to provide a catch loop and having the free ends joined with the ends of the shroud lines forming the vertex joined to the connector link, and a circular reinforcing band joined to and substantially parallel to the periphery of the canopy; and a drogue line passing through the vented apex on the canopy of said main parachute and having the upper end joined to the connector link on said drogue parachute and the lower end joined to said payload.

3. A parachute system for carrying a suspended payload and adapted to be caught and collapsed in mid-air from a recovery craft and comprising: a main parachute, a drogue parachute for flying above the main parachute, and a drogue line joining the two parachutes; said main parachute comprising a canopy having a vented apex on the axial center line, a circular band lining joined to the vented apex of the canopy for reinforcement, and a plurality of shroud lines joined to the canopy and having ends terminating in risers adapted for attaching to said payload; said drogue parachute comprising a canopy, a plurality of shroud lines joined to said canopy and having ends terminating in a vertex, a connector link joined to the vertex of the shroud lines and at least one reinforcing band joined to the canopy with slack at the apex of the canopy to provide a catch loop and having the free ends joined with the ends of the shroud lines forming the vertex joined to the connector link; said drogue line passing through the vented apex on the canopy of said main parachute and having the upper end joined to the connector link on said drogue parachute and the lower end joined to said payload.

4. A parachute system for carrying a suspended payload and adapted to be caught and collapsed in mid-air from a recovery craft and comprising: a main parachute, a drogue parachute for flying above the main parachute, and a drogue line joining the two parachutes; said main parachute comprising a canopy having a vented apex, a circular band lining joined to the vented apex of the canopy for reinforcement, and a plurality of shroud lines draped over and joined to the canopy and having ends terminating in risers adapted for attaching to said payload, said shroud lines having enough slack in their mid-portions crossing the vented apex of the canopy to provide apex lines which may be brought together and bunched into a roll at the mid-portion of the apex lines; said drogue parachute comprising a canopy, a plurality of shroud lines joined to said canopy and having ends terminating in a vertex, a connector link joined to the vertex of the shroud lines and at least one reinforcing band joined to the canopy with slack at the apex of the canopy to provide a catch loop and having the free ends joined with the ends of the shroud lines forming the vertex joined to the connector link; said drogue line passing through the vented apex on the canopy of said main parachute and having the upper end joined to the connector link on said drogue parachute and the lower end joined to said payload, said drogue line having means joined thereto for attaching the drogue line to the bunched apex lines on said main parachute by means of a break cord which breaks on deployment of the parachute system from its deployment bag.

5. A parachute system for carrying a suspended payload and adapted to be caught and collapsed in mid-air from a recovery craft and comprising: a main parachute, a drogue parachute for flying above the main parachute, and a drogue line joining the two parachutes; said main parachute comprising a canopy having a vented apex, a circular band lining joined to the vented apex of the canopy for reinforcement, and a plurality of shroud lines draped over and joined to the canopy and having ends terminating in risers adapted for attaching to said payload, said shroud lines having enough slack in their mid-portions crossing the vented apex of the canopy to provide apex lines which may be brought together and bunched into a roll at the mid-portion of the apex lines; said drogue parachute comprising a canopy, a plurality of shroud lines joined to said canopy and having ends terminating in a vertex, a connector link joined to the vertex of the shroud lines, two linear reinforcing bands draped over and joined to the canopy at substantially right angle to each other with slack at the apex of the canopy to provide a catch loop and having the free ends joined with the ends of the shroud lines forming the vertex joined to the connector link, a circular reinforcing band joined to and substantially parallel to the periphery of the canopy, and a weight attached to the shroud lines near the vertex to provide enough drag for keeping the canopy upright and functioning; said drogue line passing through the vented apex on the canopy of said main parachute and having the upper end joined to the connector link on said drogue parachute and the lower end joined to said payload, said drogue line having means joined thereto for attaching the drogue line to the bunched apex lines on said main parachute by means of a breakcord which breaks on deployment of the parachute system from its deployment bag.

6. A parachute system for carrying a suspended payload and adapted to be caught and collapsed in mid-air from a recovery craft and comprising: a main parachute having a canopy with a vented apex, and a plurality of shroud lines draped over and joined to the canopy and having ends terminating in risers adapted for attaching to said payload, said shroud lines having enough slack in their mid-portions crossing the vented apex of the canopy to provide apex lines which may be brought together and bunched into a roll at the mid-portion of the apex lines; a drogue parachute for flying above said main parachute and comprising a canopy, a catch loop joined to the canopy, and a plurality of shroud lines joined to the canopy and having ends terminating in a vertex, and a connector link joined to the vertex of the shroud lines; and a drogue line passing through the vented apex on the canopy of said main parachute and having the upper end joined to the connector link on said drogue parachute and the lower end joined to said payload, said drogue line having means joined thereto for attaching the drogue line to the bunched apex lines on said main parachute by means of a breakcord which breaks on deployment of the parachute system from its deployment bag.

References Cited in the file of this patent

UNITED STATES PATENTS

| | | |
|---|---|---|
| 1,017,767 | Kraftsik | Feb. 20, 1912 |
| 2,721,716 | Beadle | Oct. 25, 1955 |
| 2,942,815 | Gross et al. | June 28, 1960 |

OTHER REFERENCES

Aviation Week, page 104, June 13, 1960.